Sept. 25, 1951 E. M. S. McWHIRTER ET AL 2,568,755
ELECTRICAL CONSUMPTION AND CONTROL
MEASURING EQUIPMENT
Filed Nov. 27, 1945 2 Sheets-Sheet 1

INVENTORS
ERIC M. S. McWHIRTER
FREDERICK W. WARDEN
HUGH J. WARD
BY
ATTORNEY

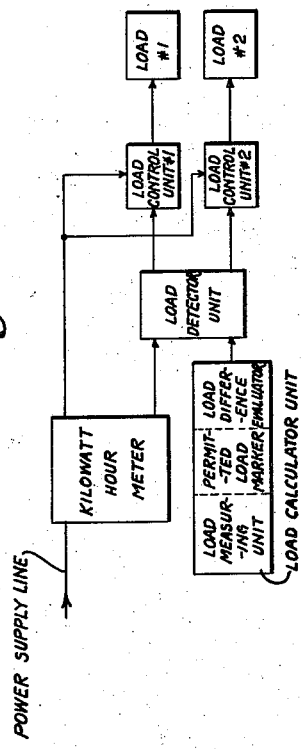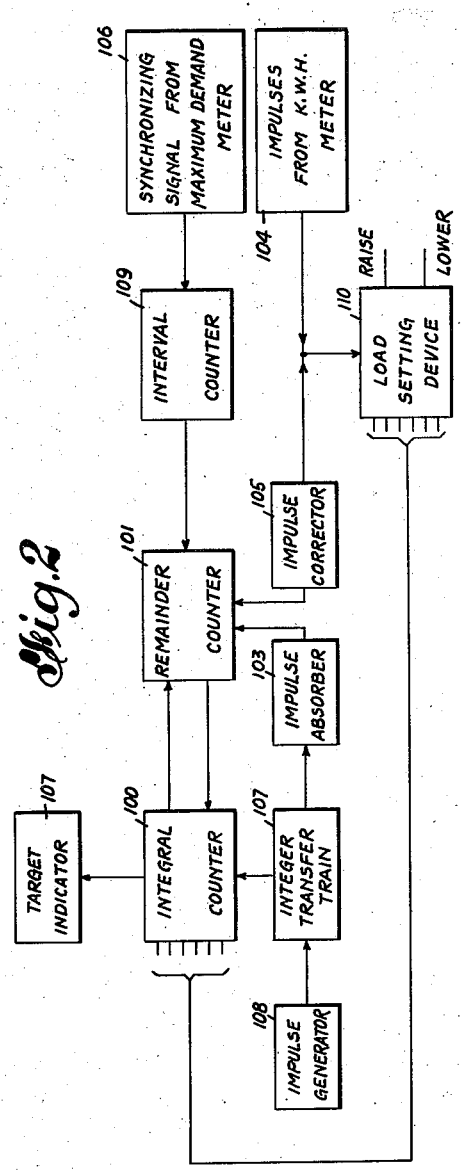

Patented Sept. 25, 1951

2,568,755

UNITED STATES PATENT OFFICE 2,568,755

ELECTRICAL CONSUMPTION AND CONTROL MEASURING EQUIPMENT

Eric Malcolm Swift McWhirter, Frederick William Warden, and Hugh Jennings Ward, London, England, assignors, by mesne assignments, to International Standard Electric Corporation, New York, N. Y., a corporation of Delaware Application November 27, 1945, Serial No. 631,155
In Great Britain November 2, 1944

Section 1, Public Law 690, August 8, 1946
Patent expires November 2, 1964

5 Claims. (Cl. 171—34)

This invention relates to equipment for measuring and performing calculations in respect of a flow-consumption which continues throughout a period of time at a possibly non-uniform rate and which is to be limited in the total quantity accumulatively consumed through that period.

In the supply of electric power to a large consumer it is a common practice to fix a maximum rate or maximum demand in K. V. A. H. at which power is to be taken and to impose heavy penalties for any transgression of this maximum. This common practice is not an arbitrary imposition on the part of the supply authority, but follows primarily from the practical consideration that the cable and other equipment carrying the supply to the consumers is limited in its capacity and that it would be dangerous if an excessive flow were sustained for any length of time.

Accordingly, the invention is particularly adapted for the measurement and control of the flow-consumption of electric energy. In the practical working out of such a system of control the maximum rate which should not be exceeded to avoid a penalty charge, is expressed to a convenient approximation as a maximum quantity not to be exceeded over a prescribed period, say half-an-hour. This is a permissible approximation since, as stated above, it is a sustained rather than a momentary overload that is dangerous.

Furthermore, the tariff or system of charges for the supply of electricity includes as an item a fixed charge which is proportionate to the above-discussed maximum rate. A consumer buys his electricity most economically when he is able to keep his rate of consumption uniform and, as nearly as possible, close to the maximum rate. In terms of half-hourly periods this would be expressed as an amount just short of the penalty rate, when each period shows a quantity consumed which is consistently almost equal to the specified half-hourly maximum.

The present invention has among its objects to provide an equipment which shall enable the consumption to be measured in a manner such that the above requirements can be readily fulfilled. Such equipment is termed a "flow consumption monitor."

In accordance with one feature of the invention as it is at present envisaged an equipment for measuring a "flow" consumption is provided with means to give, throughout a period of time, a "running" indication of such limiting rates of consumption for the diminishing unexpired portion of the period for use in ensuring that a predetermined quantity-consumption for the whole period shall not be exceeded.

It may here be noted that terms such as "running" indication, as indeed the term "flow" consumption itself, must be construed in a practical sense. Thus, although in electrical measurements there are instruments such as ammeters that give a reading of a rate that is almost that of an instantaneous value, it is quite common practice and sufficiently accurate for many purposes to determine a rate by reference to the number of units of quantity counted over a short period of say, half-a-minute. As compared with a period of say, half-an-hour, indications given every half-minute or minute are "running" indications as that term is used in this specification. So, too, a consumption of electricity measured in discrete impulses from the contacts of a rotating kwh. meter would be a "flow" consumption.

The main feature of the invention is a "flow" consumption monitor in which are provided means for setting up at the beginning of a predetermined period of time during which the total "flow" is to be limited to a predetermined maximum quantity, the average maximum permissible "flow" for the whole of the period, means operable to determine for each of a number of equal intervals comprising the said period the actual "flow" consumption individual thereto, and means operable at the beginning of each interval after the first for adjusting the value of the said average maximum permissible "flow," each one of said adjusted values reflecting the relation between the immediately previous value and the individual "flow" consumption of the immediately previous interval and being the value of the average maximum permissible flow which would apply throughout the whole of the remainder of the period if no further adjustment was effected.

The invention will be clearly understood from the following description of certain embodiments of the invention, the preferred one of which is illustrated in the accompanying drawings in which:

Fig. 1A shows in block form the order of operation of the apparatus shown in Fig. 1; and Fig. 2 shows in block form the equipment according to another embodiment of the invention;

Figure 1:
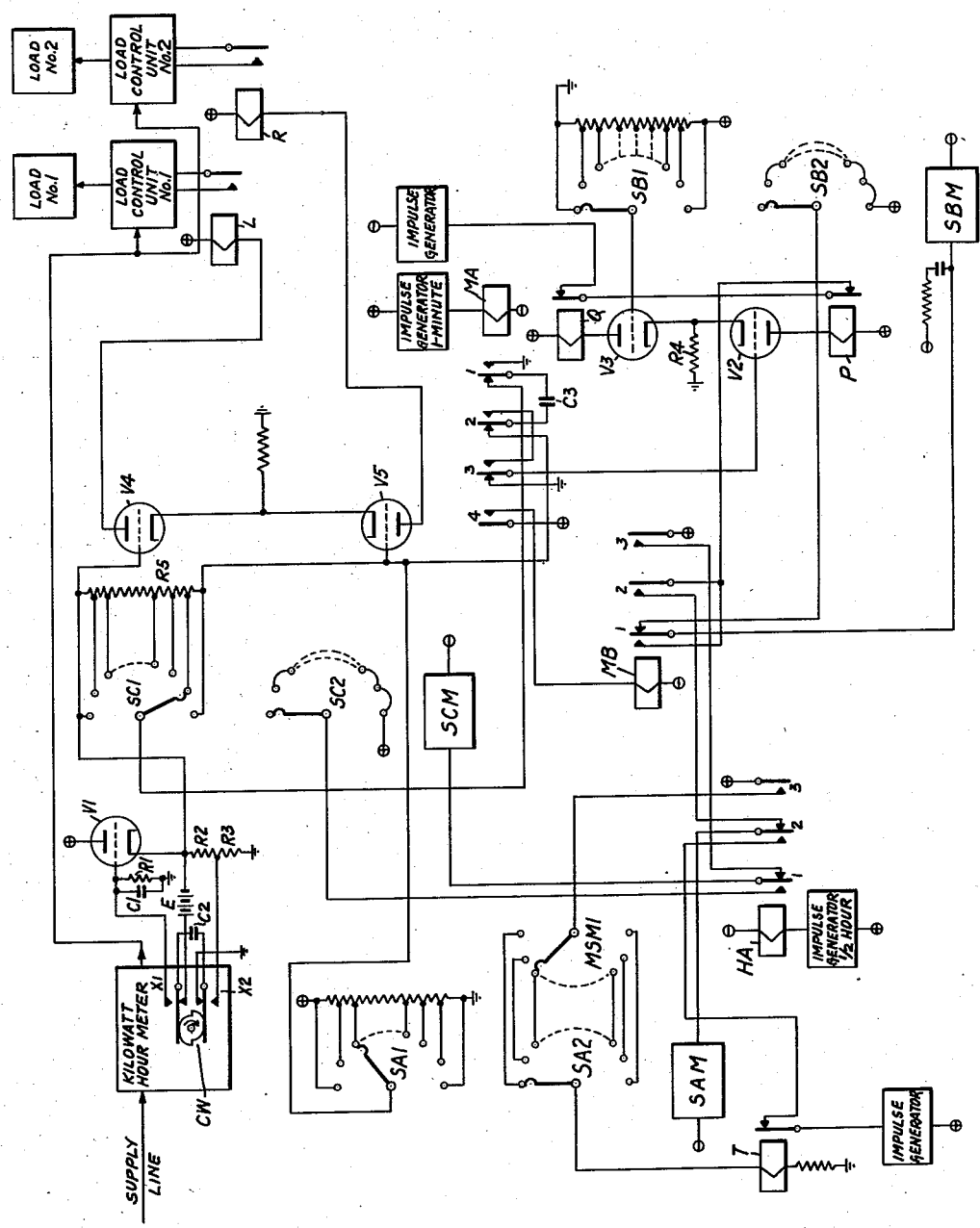
Fig. 1 shows a circuit arrangement of a flow consumption monitor embodying the invention.

The function of the equipment to be described is to allow the consumer to run the plant up to, but not exceeding, the maximum demand energy set by himself or the supply authority. This it does by permitting the plant to consume all, but not more than, the maximum demand energy allowed during each half hourly period over which the maximum demand is measured by the supply authority.

If during the first part of the half hour, energy is being used at less than the maximum demand rate, the equipment sets the target maximum demand for the rest of the half hour above the permitted maximum demand, so that if running at this target, all, but not more than, the permissible energy will be used by the end of the half-hour. The equipment varies the controllable load of the plant so that the total load consumed approximates but does not exceed the maximum demand over a half-hour period.

As shown in Fig. 1A, the equipment can be divided into three parts:
(1) Load Calculating Unit.
(2) Load Detector Unit.
(3) Load Control Units.

One each of items (1) and (2) will be required while an item (3) will be fitted to each load unit which has to be controlled.

The function of the Load Calculator is to determine the permitted load at which the factory can be run from a knowledge of the energy, consumed during the part of the maximum demand integrating period which has passed.

The function of the Load Detector Unit is to compare this permitted load with the actual load of the factory and to provide an indication as to whether the factory load is too high or too low and to inform the load control units accordingly.

The function of the Load Control Units is to increase or decrease the consumption of the controllable load in accordance with the signals from the load detector.

LOAD CALCULATING UNIT

Principles of Load Calculator

This unit is designed to calculate the permitted load at regular intervals throughout the maximum demand integration period.

Let there be $n$ calculation intervals of duration $= t$

Let the maximum demand integrated period $= T$

Let the maximum demand energy during time $T = E$

Let the average load for each calculating interval $= \omega_1 \omega_2 \ldots \omega_{n-1} \omega_n$ Let the permitted loads at the beginning of each calculating interval $= P_1 P_2 P_3 \ldots P_{n-1} P_n \ldots$ Then $$P_1 = \frac{E}{T}$$

$$P_2 = \frac{E - \omega_1 T}{T - t}$$

then $$P_2 - P_1 = \frac{E - \omega_1 t}{T - t} - \frac{E}{T} = \frac{ET - \omega_1 Tt - ET + Et}{T(T-t)}$$

$$= \frac{E - \omega_1 T}{(T-t)T} t$$

$$= \frac{\frac{E}{T} - \omega_1}{T - t} t$$

$$= \frac{P_1 - \omega_1}{T - t} \cdot t$$

$$\therefore P_2 = P_1 + \frac{P_1 - \omega_1}{T - t} t$$

$$P_3 = \frac{E - \omega_1 t - \omega_2 t}{T - 2t}$$

$$P_3 - P_2 = \frac{E - \omega_1 t - \omega_2 t}{T - 2t} - \frac{E - \omega_1 t}{T - t}$$

$$= \frac{ET - Et - \omega_1 Tt + \omega_1 t^2 - \omega_2 Tt + \omega_2 t^2 - ET + 2Et + \omega_1 Tt - 2\omega_1 t^2}{(T-2t)(T-t)}$$

$$= \frac{E - \omega_1 t - \omega_2 T + \omega_2 t}{(T-2t)(T-t)} \cdot t$$

$$= \frac{\frac{E - \omega_1 t}{T-t} - \frac{\omega_2(T-t)}{T-t}}{T-2t} t$$

$$= \frac{P_2 - \omega_2}{T - 2t} t$$

$$\therefore P_3 = P_2 + \frac{P_2 - \omega_2}{T - 2t} \cdot t$$

Now let us consider the general case:

$$P_{n+1} = \frac{E - t\sum_{n}^{1}\omega}{T - nt}$$

$$P_n = \frac{E - t\sum_{n-1}^{1}\omega}{T - (n-1)t}$$

$$P_{n+1} - P_n = \frac{E - t\sum_{n}^{1}\omega}{T - nt} - \frac{E - t\sum_{n-1}^{1}\omega}{T - (n-1)t} =$$

$$\frac{ET - (n-1)tE - tT\sum_{n}^{1}\omega + (n-1)t^2\sum_{n}^{1}\omega}{(T-nt)(T-(n-1)t)} +$$

$$\frac{-ET + nEt + tT\sum_{n-1}^{1}\omega - t^2 n \sum_{n-1}^{1}\omega}{(T-nt)(T-(n-1)t)} =$$

$$\frac{Et - tT\omega_n + (n-1)\cdot t^2 \cdot \sum_{n}^{1}\omega - t^2 \cdot n \cdot \sum_{n-1}^{1}\omega}{(T-nt)(T-(n-1)t)}$$

now $$(n-1)t^2 \sum_{n}^{1}\omega - t^2 n \sum_{n-1}^{1}\omega =$$

$$nt^2\sum_{n}^{1}\omega - nt^2\sum_{n-1}^{1}\omega - t^2\sum_{n}^{1}\omega = nt^2\omega_n - t^2\sum_{n-1}^{1}\omega - t^2\omega_n =$$

$$(n-1)t^2\omega_n - t^2\sum_{n-1}^{1}\omega$$

$$\therefore P_{n+1} - P_n = \frac{Et - tT\omega_n + (n-1)t^2\omega_n - t^2\sum_{n-1}^{1}\omega}{(T-nt)(T-(n-1)t)}$$

$$= \frac{E - t\sum_{n-1}^{1}\omega}{(T-nt)(T-(n-1)t)} t -$$

$$\frac{\omega_n t(T - (n-1)t)}{(T-nt)(T-(n-1)t)}$$

$$= \frac{P_n - \omega_n}{T - nt} t$$

$$\therefore P_{n+1} - P_n = \frac{P_n - \omega_n}{T - nt} \cdot t$$

(This formula agrees with the results obtained above for specific intervals.)

Thus the new permitted load ($P_{n+1}$) can be calculated from the previous figure ($P_n$) by measuring the actual load ($\omega_n$) subtracting this figure from the permitted load to give $P-\omega_n$ then multiplying this quantity by $$\frac{t}{T-nt}$$

and adding to the permitted load $P_n$. The expression $$\frac{t}{T-nt}$$

is the quantity $$\frac{1}{\text{number of calculating intervals left}}$$

Operation of Load Calculator

The load calculator is designed for 1 minute calculating intervals.

As shown in Fig. 1A, the load calculator consists of
   (1) The load measuring unit.
   (2) The permitted load marker.
   (3) The load difference evaluator.

As will be seen in Fig. 1, the load measuring unit consists of a valve $V1$, condensers $C1$ and $C2$, resistances $R1$, $R2$ and $R3$, and condenser charging battery E, which battery has an E. M. F. of $e$. Contacts $x1$ and $x2$ are actuated by a cam-wheel CW which wheel is coupled to the kilowatthour meter disk shaft (not shown). The contacts $x1$, $x2$ are closed by the rotation of the cam-wheel which operates at a rate of speed dependent upon the electrical energy passing from the power supply line through the kilowatthour meter through the Load Control Units and to the Loads.

With contacts $x1$ and $x2$ as shown in Fig. 1, condenser $C2$ is charged from the battery E and with $x1$, $x2$ operated $C2$ is placed in parallel and shares its charge with condenser $C1$. Condenser $C1$ is shunted with a leak resistance $R1$ so that its charge may decay at a predetermined rate. As the contacts $x1$, $x2$, operate and release, the contribution of charge via $C2$ from the battery E and the decay of the charge in $C1$ through resistance $R1$ cause the grid voltage of $V1$ to vary with the speed of operation. If the operation of $x1$, $x2$ is at a constant speed, the grid voltage of $V1$ will assume a steady value.

Suppose the valve circuit $V1$ is in such a stable condition with a resultant voltage E on the grid of $V1$.

With the contacts $x1$, $x2$ as shown, condenser $C2$ is placed in parallel with $C1$.

$Q_t$ = (the total charge in $C1$ and $C2$) =

$$C1 \cdot E + C2\left(e + Eg + \frac{Eg - R_3}{R_2 + R_3}\right)$$

If $$g \cdot \frac{R3}{R2+R3} = 1 - g$$

then $$Q_T = C1E + C2e + C_2E$$
$$= (C1+C2)E + C_2e$$

∴ new voltage of $C1 = \frac{Q_T}{C1+C2} = E + \frac{C2 \cdot e}{C1+C2}$

∴ gain in voltage on $C1$ for each operation of contacts $x1$, $x2 = e \cdot \frac{C2}{C1+C2}$ If successive operations of the contacts $x1$, $x2$ are $t$ secs. apart i. e. $t$=time between impulses from kwh. meter the loss in charge on $C1$ between operations $$= \frac{E}{R1} \cdot t$$

if $t$ is small compared with $C1 \cdot R1$.

Now, loss in charge=gain in charge.

$$\therefore \frac{E}{R1} \cdot t = \frac{eC_2}{C_1+C_2}$$

or $$E = \frac{e \cdot R1 \cdot C2}{C1+C2} \cdot \frac{1}{t}$$

where $$\frac{e \cdot R1 \cdot C2}{C1+C2}$$

is constant and $$E \propto \frac{1}{t}$$

Now the load on the factory (equals rotational speed of kwh. meter)

$$\propto \frac{1}{t}$$

∴ $E \propto$ factory load.

We have therefore produced a voltage proportional to $\omega_n$.

The permitted load marker consists of switch SA, having driving magnet SAM, and two contact banks SA1 and SA2 one of whose banks SA1 together with its wiper is wired as a potentiometer across the D. C. supply. The switch is so controlled that the voltage between the wiper SA1 and earth gives a voltage proportional to the permitted load $P_n$ to the same scale as E is proportional to the actual load.

At the beginning of each half hour integration period relay HA is operated for about a second. This connects the coil of driving magnet SAM to a source of impulses so that SA drives until relay T operates.

Relay T operates when the wiper SA2 reaches a position corresponding to the setting of a Maximum Demand setting switch wiper MSM1. The wiper of MSM1 is manually set to a predetermined position on its contacts dependent upon the maximum demand permitted. In this condition the voltage on SA1 between wiper and earth corresponds to the permitted load for the first interval ($P_1$) determined by the maximum demand at which the factory is to run.

The Load Difference Evaluator

The Load Difference Evaluator takes the $$\frac{t}{T-nt}$$

part of $P_{n+1}-P_n$ and adds it to the setting of SA1. As stated the quantity $$\frac{T-nt}{t}$$

is the same as the reciprocal of the number of minutes left in the half hour of the maximum demand integration, i.e. $\frac{1}{29} \frac{1}{28} \frac{1}{27}$ etc. to $\frac{1}{3} \frac{1}{2} \frac{1}{1}$ The quantity $P_n - \omega_n$ is the voltage difference between the cathode of $V_1$ and the wiper SA1 which are connected by a resistance R5 tapped off at $$\frac{1}{29} \frac{1}{28} \frac{1}{27} \text{ etc.}$$

down to $$\frac{1}{1}$$

these tappings being picked up by switch wiper of SC1, associated with time switch SC having driving magnet SCM, and two contact banks SC1 and SC2.

At the beginning of the half-hour integration period, switch SC is restored to its home position by contact ha1 operating and connecting the coil of driving magnet SCM to its homing arc SC2. The home position of wiper SC1 corresponds to the $$\frac{1}{29}$$

tap on resistance R5.

During the first minute condenser C3 has acquired a voltage equal to 1/29 of the voltage difference between the cathode of V1 and wiper SA1 i. e. proportional to $$\frac{P_1-\omega_1}{29}$$

At the end of the first minute an impulse operates relay MA and the voltage on C3 is transferred to the balance detector consisting of valves V2 and V3. Relay MB operates over contacts ma4 disconnecting the homing circuit of SBM. As the voltage on the grid of V2 is now greater than that on the grid of V3 which is earthed only V2 passes anode current thus operating relay P. The contacts p1 connect the coils of SAM and SBM to a source of impulses, thus stepping switches SA and SB until the voltage on V3 grid via SB1 equals that on V2 grid when relay Q will operate. Thus, as the voltage change per step of SA1 and SB1 is the same, the wiper voltage on SA1 has been increased by an amount equal to the voltage on C3 which is proportional to $$\frac{P_1-\omega_1}{29}$$

Thus the new setting of $$SA1 = P_1 + \frac{P_1-\omega_1}{29} = P_2$$

When relays MA and MB release, SB is restored to its home position and coil SCM, which has been operated via ha1 back, mb3 front, releases, so that SC1 is stepped one step to the $$\frac{1}{28}$$

position on R5 and C3 is now connected so that it charges up to a voltage proportional to $$\frac{P_2-\omega_2}{28}$$

which is added to $P_2$ at the end of the second minute to give $$P_2 + \frac{P_2-\omega_2}{28} = P_3$$

Thus, minute by minute, the voltage on the wiper of SA1 is changed to give the value of $P_n$ until at the end of the half hour HA again operates readjusting the voltage on the wiper SA1 to a value corresponding to $P_1$.

LOAD DETECTOR UNIT

The load detector unit compares the actual load passing through the kilowatt-hour meter with the permitted load and determines which is the greater and operates the control relays L and R accordingly.

Valves V4 and V5 are used to carry out this function. Whichever valve has the greatest voltage on its grid passes anode current while the other valve is biased back to cut off. Thus if the factory load is greater than the permitted load valve V4 conducts and relay L operates. Similarly if the factory load is less than the permitted load relay L releases and relay R operates.

Relays R and L signal to the load control units which raise or lower the controllable load accordingly.

LOAD CONTROL UNITS

The load control units may comprise any of the well-known methods of varying load such as changing the voltage of the supply to the controllable load by varying a resistance in series with the controllable load.

Another approach to the problem is as follows: Let the period over which observations are to be made be half-an-hour, and let the maximum quantity-consumption for that period be 4800 units. Furthermore, let the period be divided into sixty half-minute intervals with respect to which the rates of consumption are calculated, being expressed in units per interval.

At the beginning of a certain half-minute interval there exists a certain "stock" of unspent units: in the case of the first interval it is 4800 units. There exists also a "target" for that interval which is found by dividing that stock by the number of half-minute intervals as yet unspent: in the case of the first interval it is 4800÷60=80 units. Finally at the end of that half-minute interval there has been a certain consumption during that interval, in other words a certain reduction in the unspent stock, and this reduced unspent stock must be divided by the number of half-minute intervals now to go, in order to find the target for the next half-minute interval. We can thus construct a table for the first few intervals, showing stock, target, and consumption, for the several intervals:

| Interval | Stock | Target | | Consumption |
|---|---|---|---|---|
| 1 | | 4,800 | $\frac{4,800}{60}=$ | 80 | 80 |
| 2 | 4,800− 80= | 4,720 | $\frac{4,720}{59}=$ | 80 | 80 |
| 3 | 4,720− 80= | 4,640 | $\frac{4,640}{58}=$ | 80 | 194 |
| 4 | 4,640−194= | 4,446 | $\frac{4,446}{57}=$ | 78 | 134 |
| 5 | 4,446−134= | 4,312 | $\frac{4,312}{56}=$ | 77 | 22 |
| 6 | 4,312− 22= | 4,290 | $\frac{4,290}{55}=$ | 78 | 29 |
| 7 | 4,290− 29= | 4,261 | $\frac{4,261}{54}=$ | ? | |

It will be seen from the table that in the first two intervals the consumption actually equalled the target: and it will be appreciated that to keep running in this wise, steadily throughout the sixty intervals of the half-hour period would be the ideal. However, in the third and fourth intervals it is supposed that the consumption exceeded the target, with the consequence that each next later interval, i. e. the fourth and fifth respectively, have their targets reduced below that of the immediately preceding interval. Finally, in the fifth interval it is supposed that the consumption falls short of the target for that interval so that the target for the sixth interval is greater than that for the fifth.

Down as far as the fifth interval the hypothetical consumption values have been worked out so that the next interval's target shall be a whole number: but when we reach the sixth interval we see that the target for the seventh interval is no longer integral. This, of course, represents by far the more probable case, and is of very great importance in any embodiment of the invention making use of metering by discrete units, as for example where an electricity consumption is measured by a rotating kwh. meter, and readings are taken off as impulses from associated contacts closed, say once per revolution.

Consideration of the invention in this aspect necessitates something of an algebraical exposition: we therefore make use of the following symbols:

E is the maximum quantity-consumption in discrete units during a period, the initial "stock."
$n$ is the number of intervals into which the period is divided.
$T_p$ is the target for the $p$th interval.
$e_p$ is the quantity consumed during the $p$th interval; and finally
I[ ] is the integral part of the division shown within the square brackets (very often the symbol I can stand alone or with a suffix, $I_p$, without loss of clarity).

Now in an embodiment of the invention it was found convenient to work on the rule for ascertaining the target $T_p$, that at the beginning of that interval the unexpended "stock" should, as far as possible, be shared equally among all remaining intervals, any surplus being apportioned, one each, to the earlier of such, the stock allotted to any of these being taken as the immediate target.

The target $T_1$ for the first interval is found to be, by substituting in a general expression, $$T_1 = I\left[\frac{E-1}{n}\right] + 1$$

which can be written as $$T_1 = I\left[\frac{E+n-1}{n}\right] \quad (1)$$

Similarly the target $T_2$ for the second interval is $$T_2 = I\left[\frac{E-e_1+n-2}{n-1}\right] \quad (2)$$

and in general $$T_p = I\left[\frac{\sum_1^{E-p-1} e + n - p}{n-p+1}\right] \quad (3)$$

In each of these equations the dividends on the right-hand side may conveniently be designated D, so that $$D_1 = E + n - 1 + T_1 \cdot n + r_1 \quad (4)$$
$$D_2 = D_1 - e_1 - 1 = T_2(n-1) + r_2 \quad (5)$$
$$D_3 = D_2 - e_2 - 1 = T_3(n-2) + r_3 \quad (6)$$
$$D_p = D_{p-1} - e_{p-1} - 1 = T_p(n-p+1) + r_p \quad (7)$$

In another embodiment of the invention, shown diagrammatically in Fig. 2, the permitted load calculator was not directly concerned with the original maximum consumption E at all, but with the quantity D which was derived therefrom in the manner indicated in Equation 4 above. The calculator in question comprised an integral counter 100 and a remainder counter 101, the quantity $T_1$ being set up in the integral counter and the quantity $r_1$ in the remainder counter. (These two together give the total $D_1$ if the number set up in the integral counter be thought of as a number expressed in radix $n$.)

The major functions of the calculator at the end of each interval are (1) in respect of the dividend, to make the change from $D_1$ to $D_2$, from $D_2$ to $D_3$, and so on, and (2) in respect of the divisor, to make the change from $n$ to $n-1$, from $n-1$ to $n-2$, and so on. Actually, the second of these functions is taken care of by causing the calculator to express its contents in numbers of successively decreasing radices, $n$, $n-1$, and so on.

Considering then the dividend-transfer function, we see from equations 4 and 5 that $$D_1 = T_1(n-1) + r_1 + T_1$$
$$D_2 = T_1(n-1) + r_1 + (T_1-1) - e_1$$

Thus, starting with $T_1$ set up in the integral counter, and $r_1$ set up in the remainder counter, we take out from the integral counter the quantity $(T_1-1)$ and add it to the remainder counter, and at the same time subtract from the remainder counter the quantity $e_1$.

At this point we may think of the counters as together expressing the new dividend $D_2$, the integral counter holding the quantity $T_1(n-1)$ by its indication $T_1$ in radix $(n-1)$, and the remainder counter holding the quantity $$[r_1 + (T_1 - 1) - e_1]$$

It is then necessary to make-up as between the remainder counter and the integer counter: that is, the quantity in the remainder counter must be corrected as to any excess over the new radix $(n-1)$ or deficiency below 0, the contents of the integral counter being augmented or depleted correspondingly, such transfers being made in radix $(n-1)$. When this has been done, the integral counter will show the new target $T_2$ and the remainder counter will show the new remainder $r_2$.

The actual transfer of the quantity $(T_1-1)$ is made through an integer transfer train 102 and impulse absorber 103 in which one impulse is absorbed: while the deduction of the consumed quantity $e_1$ from the remainder counter is made after the impulses comprising this quantity incoming from say a kwh. meter 104 have been individually standardized by an impulse corrector 105.

It may be helpful to consider what has just been discussed algebraically by reference to the numerical data given earlier on.

There we started with $E=4800$, and $n=60$. This gives up $D_1=4859$, $T_1=80$, $r_1=59$: i. e. the integral counter will have the setting 80 and the remainder counter will have the setting 59, which is one less than the radix 60, thus showing that 4,800 is exactly divisible by 60.

For the first interval we had $e_1=80$: so transferring $(T_1-1)=79$ units from the integral counter to the remainder counter we have in the remainder counter $$59 - 80 + 79 = 58$$

which is, as in the first case, one less than the new radix 59. There is thus no excess or deficiency in the remainder counter, and the integral counter continues to give the target $T_2 = 80$.

In preparation for the third interval again, we have the remainder counter losing 80 and receiving 79, so that its new setting is 57.

During this third interval the consumption is 194, and so the remainder reading is changed:

$$57 - 194 + 79 = -58$$

This deficiency calls for a make-up from the contents of the integral counter. Thus the target $T_4$ is stepped down from 80 to 78, and the reduction of 2 in radix 57 constitutes an addition of 114 units in the remainder counter, where the setting will now be reduced to 56.

In the fourth interval, $e_4 = 134$, and $T_4 - 1 = 77$, so we have in the remainder counter $$56 + 77 - 134 = -1$$

which is made up by a further reduction in the integral counter of 1 in radix 56. So, for the fifth interval, we see 77 in the integral counter and 55 in the remainder counter.

During the fifth interval the consumption $e_5$ is 22 so that the remainder counter has a setting $$55 + 76 - 22 = +109$$

showing an excess which is taken up by the transfer of 1 (in radix 55) to the integral counter, leaving 54 in the remainder counter. This gives 78 as the target $T_6$ for the sixth interval, and still one less than the radix in the remainder counter.

Finally, during the sixth interval the consumption is 29, so that in the remainder counter $$54 + 77 - 29 = 102$$

Transferring the excess of 1 in radix 54 to the integral counter, we see there is a target of 79, and in the remainder counter a remainder $r_7$ of 48. The fact that this remainder is less than the maximum possible, i. e. 53, shows that the division of the stock 4261 by the radix 54 gives a fractional quotient.

It should perhaps be pointed out that although for convenience the above description reads as though the changes in respect of the $p$th interval occur at the end of the $(p+1)$th interval: in fact these changes occur at the beginning of the $(p+1)$th interval. Thus it is actually at the beginning of the first interval that the change of radix is made from 60 to 59, this starting of the sequence being synchronized with the beginning of a half-hour period as indicated by a pulse from the supply authority's maximum demand meter. Again the transfer of the $(T_1-1)$ pulses is made, pulse by pulse, throughout the first half-minute interval in a manner which does not coincide with the arrival of pulses from the kwh. meter.

The following is a short description of the calculator: As stated, there is an integral counter 100 and a remainder counter 101, each consisting of relay trains in which the respective quantities would be set up from the maximum demand meter 106 at the beginning of a half-hour period by selective operation of the relays. Associated with the integral counter is, on the one hand a target indicator 107 and on the other hand, an integer transfer train 102. Into each of these the reading of the integral counter is fed at the beginning of each interval, to the target indicator to give a visual indication of the target for that interval and the integer transfer train to feed $(T_p - 1)$ impulses into the remainder counter before the beginning of the next interval. Once the target indicator and integer transfer train have received the reading of the integral counter in respect of a certain interval, they remain independent of the integral counter until the time comes for them to be adjusted in respect of the next interval. The integral counter itself is in permanent association with the remainder counter, so that an excess or deficiency in the remainder counter never does actually occur, being corrected instantly by the integral counter. In other words the reading of the integral counter can fluctuate continuously just as also can that of the remainder counter.

The integer transfer train, having received the reading $T$, is associated with an impulse generator 108 which feeds impulses into the remainder counter under the control of the integer transfer train until $T$ impulses have been fed. The integer transfer train has then been emptied and the impulse generator stops. The first of these $T$ impulses does not reach the remainder counter, being absorbed in the initial impulse absorber 103. These $(T-1)$ impulses, of course, are added to the quantity stored in the remainder counter.

Impulses from the kwh. meter also pass into the remainder counter through the impulse corrector 105. These impulses, the quantities $e$ in the above discussion, are subtracted from the quantity stored in the remainder counter.

Associated with the remainder counter is an interval counter 109, which receives a synchronising signal at the beginning of each half-minute interval from the supply authority's maximum demand meter 106. The interval counter has the function of changing the radix in which the integral and remainder counters are working. One convenient way of accomplishing this is by changing the starting point in the relay counting chain or chains in the remainder counter.

The calculator also includes means for indicating the relationship between the target and the rate of consumption. A load setting device 110 is associated both with the integral counter and with the incoming path for meter impulses. From the latter, the load setting device derives instantaneous measurements of load; and according as to whether these measurements are above or below the target load as marked by the integral counter, it sends a signal to indicate either that the load must be decreased or that the load may be increased.

As the best approximation to instantaneity of load, the load setting device works not by impulses but by the number of cycles of the supply frequency between impulses, this number of cycles being inversely proportional to the load. Thus if the integral counter gives "$f$" cycles as the target load, a "decrease" number of cycles is sent if this signal is not attained, no signal if it is just reached, and an increase signal if there are more than "$f$" cycles between impulses.

The signals may be utilised not merely as indications to an operator, but as means for effecting the needed control itself, thus providing partial or full automaticity.

The invention may make use of electronic discharge devices such as cold cathode tubes additional or alternative to relays. Thus U. S. Patents 2,303,106 to Blount and 2,421,005 to Bray et al. describe impulse counting circuits that make use of cold cathode tubes.

What is claimed is:

1. Electrical impulse counting equipment for indicating the quantity of energy consumed during a predetermined period of time comprising, in combination with a metering device, means for totalizing the flow consumption of said energy for successive incremental intervals of time within said predetermined time period, means for normally allocating consumption of a given portion of the total quantity of said energy in each incremental interval, means for comparing the energy actually consumed in each time interval with the energy normally allocated to each such time interval to obtain the difference therebetween, and means for modifying said means for normally allocating consumption of a given portion of the total quantity of said energy in each succeeding incremental interval in accordance with said difference.

2. Electrical impulse counting equipment as claimed in claim 1, wherein said totalizing means comprises a source of impulses whose repetition rate is under control of said metering device and integrating means coupled to said source for integrating the impulses from said source to obtain a consumption voltage.

3. Electrical impulse counting equipment as claimed in claim 1, wherein said means for normally allocating consumption of a given portion of the total quantity of said energy in each incremental interval comprises a source of voltage, a voltage divider resistance in shunt with said voltage source, said resistance having a plurality of tapped terminals, and means for varying the effective voltage across said terminals in accordance with the energy consumed in elapsed successive incremental periods of time.

4. Electrical impulse counting equipment as claimed in claim 1, wherein said comparing means comprises a storage circuit.

5. Electrical impulse counting equipment, as claimed in claim 1, wherein said modifying means comprises a voltage source, a first potentiometer having a movable cursor, said potentiometer in shunt with said source, a second potentiometer having a movable cursor, said potentiometer having one end thereof connected to the cursor of said first potentiometer, means to periodically advance the cursor of said second potentiometer a predetermined distance, such distance being indicative of each incremental time interval, whereby the effective resistance value of said first potentiometer is altered in accordance with the position of said second potentiometer, a balance detector connected to the cursor of said first potentiometer, a condenser, means to periodically alternately serially connect said condenser between the cursors of said potentiometers and said balance detector.

ERIC MALCOLM SWIFT McWHIRTER.
FREDERICK WILLIAM WARDEN.
HUGH JENNINGS WARD.

REFERENCES CITED

The following references are of record in the file of this patent:

UNITED STATES PATENTS

| Number | Name | Date |
|---|---|---|
| Re. 21,155 | Miller | July 18, 1939 |
| 1,614,212 | Smith | Jan. 11, 1927 |
| 1,801,106 | Price | Apr. 14, 1931 |
| 1,894,838 | Weaver | Jan. 17, 1933 |
| 1,904,166 | McLenegan | Apr. 18, 1933 |
| 1,953,114 | Lenehan | Apr. 3, 1934 |
| 1,959,278 | Kaufmann | May 15, 1934 |
| 1,988,278 | Kaufmann | Jan. 15, 1935 |
| 2,312,491 | Sieuent | Mar. 2, 1943 |
| 2,348,058 | Coates et al. | May 2, 1944 |